United States Patent
Guo et al.

(10) Patent No.: US 12,309,470 B2
(45) Date of Patent: May 20, 2025

(54) CAMERA ASSEMBLY AND ELECTRONIC DEVICE WITH FASTENED HOLDER FOR EFFICIENT MOVEMENT

(71) Applicant: Huawei Technologies Co., Ltd., Shenzhen (CN)

(72) Inventors: Chaofan Guo, Dongguan (CN); Kai Feng, Xi'an (CN); Yan He, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 105 days.

(21) Appl. No.: 17/917,647

(22) PCT Filed: Feb. 26, 2021

(86) PCT No.: PCT/CN2021/078266
§ 371 (c)(1),
(2) Date: Oct. 7, 2022

(87) PCT Pub. No.: WO2021/203866
PCT Pub. Date: Oct. 14, 2021

(65) Prior Publication Data
US 2023/0141126 A1    May 11, 2023

(30) Foreign Application Priority Data
Apr. 7, 2020 (CN) .......................... 202010266547.1

(51) Int. Cl.
*H04N 23/51* (2023.01)
*G06F 1/16* (2006.01)
*H04N 23/57* (2023.01)

(52) U.S. Cl.
CPC ........... *H04N 23/51* (2023.01); *G06F 1/1686* (2013.01); *H04N 23/57* (2023.01)

(58) Field of Classification Search
CPC ........ H04N 23/51; H04N 23/57; H04N 23/50; G06F 1/1686
See application file for complete search history.

(56) References Cited

U.S. PATENT DOCUMENTS

2019/0138062 A1* 5/2019 Zeng ...................... H04N 23/51
2019/0163242 A1* 5/2019 Zeng ...................... H04N 23/50
(Continued)

FOREIGN PATENT DOCUMENTS

| CN | 102833476 A | 12/2012 |
|---|---|---|
| CN | 203588597 U | 5/2014 |

(Continued)

*Primary Examiner* — Gevell V Selby
(74) *Attorney, Agent, or Firm* — Conley Rose, P.C.

(57) ABSTRACT

This application provides a camera assembly that comprises a fastened holder; a camera module, where two opposite side faces of the camera module each are connected to the fastened holder by using a guide structure, and the guide structure is configured to guide the camera module to slide in a first direction; a plurality of push rods, the plurality of push rods are symmetrically arranged with respect to a center line of the camera module, and the center line is parallel to the first direction; and a driving source, where the driving source and the fastened holder are fastened relative to each other, the plurality of push rods are connected to the driving source, the driving source is configured to drive the plurality of push rods to move synchronously, and a moving direction of the push rods is parallel to the first direction.

21 Claims, 8 Drawing Sheets

(56) References Cited

U.S. PATENT DOCUMENTS

| | | |
|---|---|---|
| 2019/0250667 A1 | 8/2019 | Fan et al. |
| 2019/0384515 A1 | 12/2019 | Wang et al. |
| 2020/0033697 A1 | 1/2020 | Rami |
| 2020/0064882 A1* | 2/2020 | Chiu .................. H04N 23/54 |
| 2020/0177715 A1* | 6/2020 | Chen .................. H04N 23/57 |
| 2020/0213491 A1 | 7/2020 | Huang et al. |
| 2020/0336575 A1* | 10/2020 | Li .................. H04M 1/0264 |
| 2020/0366851 A1 | 11/2020 | Zhang et al. |
| 2020/0374433 A1 | 11/2020 | Zhang et al. |
| 2023/0141126 A1 | 5/2023 | Guo et al. |

FOREIGN PATENT DOCUMENTS

| | | |
|---|---|---|
| CN | 204231496 U | 3/2015 |
| CN | 103546687 B | 4/2017 |
| CN | 107339576 A | 11/2017 |
| CN | 108924311 A | 11/2018 |
| CN | 208401984 U | 1/2019 |
| CN | 208724026 U | 4/2019 |
| CN | 110166664 A | 8/2019 |
| CN | 110166666 A | 8/2019 |
| CN | 110233959 A | 9/2019 |
| CN | 110248065 A | 9/2019 |
| CN | 209572070 U | 11/2019 |
| CN | 210034912 U | 2/2020 |
| CN | 113497870 B | 9/2022 |
| EP | 3525428 A1 | 8/2019 |
| EP | 3525433 A1 | 8/2019 |
| JP | 2020527916 A | 9/2020 |
| JP | 2020160316 A | 10/2020 |
| KR | 20140133716 A | 11/2014 |
| WO | 2017128698 A1 | 8/2017 |

\* cited by examiner

CAMERA ASSEMBLY AND ELECTRONIC DEVICE WITH FASTENED HOLDER FOR EFFICIENT MOVEMENT

CROSS-REFERENCE TO RELATED APPLICATIONS

This is a U.S. National Stage of International Patent Application No. PCT/CN2021/078266 filed on Feb. 26, 2021, which claims priority to Chinese Patent Application No. 202010266547.1 filed on Apr. 7, 2020. Both of the aforementioned applications are hereby incorporated by reference in their entireties.

TECHNICAL FIELD

This application relates to the field of electronic device technologies, and in particular, to a camera assembly and an electronic device.

BACKGROUND

Currently, in a camera assembly with a pop-up/down function in an electronic device, a single push rod is usually used to push a camera module to move along a single guide rail, the push rod is disposed on one side of the camera submodule, and a slide is set on the other side that is of the camera module and that is opposite to the push rod. When a solution of the single push rod and the single guide rail is applied to a camera module of a large size in a large display (usually at least 50 inches), the camera module is easily stuck in a moving process. Consequently, the camera module does not move smoothly, and user experience is reduced.

SUMMARY

This application provides a camera assembly and an electronic device, to mainly reduce a probability that a camera module is stuck in a moving process, so that the camera module moves smoothly, and user experience is improved.

To achieve the foregoing objective, the following technical solutions are used in this application.

According to a first aspect, this application provides a camera assembly, disposed on an electronic device. The camera assembly includes:
  a fastened holder;
  a camera module, where two opposite side faces of the camera module each are connected to the fastened holder by using a guide structure, and the guide structure is configured to guide the camera module to slide in a first direction relative to the fastened holder;
  a plurality of push rods, where the plurality of push rods and the camera module are fastened relative to each other, the plurality of push rods are symmetrically arranged with respect to a center line of the camera module, and the center line is parallel to the first direction; and
  a driving source, where the driving source and the fastened holder are fastened relative to each other, the plurality of push rods are connected to the driving source, the driving source is configured to drive the plurality of push rods to move synchronously, and a moving direction of the push rods is parallel to the first direction.

In the camera assembly provided in this application, plurality of push rods are symmetrically arranged with respect to the center line of the camera module. In this case, push/pull forces exerted by the push rods on two sides of the camera module are symmetrical, to avoid a case in which a large push/pull force is exerted on one end and a small push/pull force is exerted on the other end. In addition, because the two opposite sides of the camera module each are connected to the fastened holder by using the guide structure, the camera module on which symmetrical forces are exerted can stably slide along the oppositely arranged guide structures relative to the fastened holder. Compared with the conventional technology, in this application, a probability that the camera module is stuck during movement is effectively reduced. The probability that the camera module is stuck is reduced even if the camera module has a large size.

In a possible implementation of the first aspect, the guide structure includes: a guide shaft, where the guide shaft and the fastened holder are fastened relative to each other, and an extension direction of the guide shaft is parallel to the first direction; and a sliding sleeve, where the sliding sleeve is sleeved outside the guide shaft, the sliding sleeve can slide in the extension direction of the guide shaft, and the camera module and the sliding sleeve are fastened relative to each other. The camera module slides by using the guide shaft and the sliding sleeve in a clearance fit. The guide structure is simple, and an implementation is convenient.

In a possible implementation of the first aspect, car seats are disposed at locations on the fastened holder that are close to two end portions of the guide shaft, the car seats include insertion holes, the guide shaft passes through the insertion holes and is fastened on the ear seats, and the sliding sleeve is slidably disposed on a shaft section that is of the guide shaft and that is between the two ear seats. The guide shaft is fastened by using the two oppositely disposed ear seats. The ear seats not only function as fastening seats, but also can prevent the sliding sleeve from sliding out from the end portion of the guide shaft, to play a limiting role. One structure is used to implement two functions, to simplify a structure of the entire camera assembly.

In a possible implementation of the first aspect, the driving source includes: a drive motor; a transmission screw rod, where one end of the transmission screw rod is connected to an output shaft of the drive motor, and an extension direction of the transmission screw rod is parallel to the first direction; a traction member, where the traction member threadedly matches the transmission screw rod, and the traction member is connected to the plurality of push rods, to drive the plurality of push rods to move synchronously; and a leading structure, where the leading structure is configured to guide the traction member to move along the transmission screw rod. The driving source performs spiral driving, so that the camera module moves relative to the fastened holder, and one drive motor is used to implement synchronous movement of the plurality of push rods. Compared with a case in which a plurality of drive motors are used, in this application, manufacturing costs are reduced, and noise is reduced.

In a possible implementation of the first aspect, the camera module includes: a pop-up/down housing, where the pop-up/down housing is connected to the plurality of push rods, and the pop-up/down housing is provided with a light transmission hole; and a circuit board, where the circuit board is disposed inside the pop-up/down housing, and a camera is disposed at a location that is on the circuit board and that is opposite to the light transmission hole. The circuit board on which the camera is mounted is disposed inside the pop-up/down housing, to protect an electronic component on the circuit board.

In a possible implementation of the first aspect, the driving source is disposed close to a middle location at a bottom of the fastened holder, one push rod is disposed at each of two sides of the driving source, a concave region is formed at a location that is on the pop-up/down housing and that is close to the driving source, the driving source drives, by using the push rod, the camera module to move between a pop-up location and a pop-down location, the driving source is located in the concave region when the camera module is at the pop-down location, and the driving source is separated from the concave region when the camera module is at the pop-up location. The concave region for placing the driving source is formed on the pop-up/down housing, to reduce a size of the entire camera assembly, and reduce occupied space inside a housing of the electronic device.

In a possible implementation of the first aspect, a location detection structure is further included. The location detection structure includes a magnetic induction sensor and a magnet, the magnetic induction sensor is disposed on the circuit board, the magnet is fastened on the fastened holder, and in a moving process of the camera module, the magnetic induction sensor can sense a change in a magnetic field of the magnet and output a changed electrical signal.

In a possible implementation of the first aspect, the push rod is of an inverted T-shaped structure. The push rod of the inverted T-shaped structure is used, so that the push rod and the camera module have a large contact area. When the push rod is used to push/pull the camera module, the camera module has a large area of thrust surface, and moves more stably.

In a possible implementation of the first aspect, a size of the camera module in a length direction is from 50 mm to 300 mm, and the length direction of the camera module is a direction perpendicular to the first direction. Because a length of the camera module is between 50 mm and 300 mm, in other words, the camera module is a large-size camera module, the plurality of symmetrically arranged push rods are used to push/pull the large-size camera module, so that the large-size camera module moves smoothly.

According to a second aspect, this application further provides an electronic device, including: a housing, where the housing includes an avoidance hole through which a camera module passes; a display, where the display is disposed on the housing; and the camera assembly according to any one of the first aspect or the implementations of the first aspect. A fastened holder, a driving source, and a push rod are all disposed inside the housing; the driving source is configured to drive the push rod to move, so that the camera module moves between a pop-up location and a pop-down location relative to the fastened holder; the camera module is located outside the housing when the camera module is at the pop-up location; and the camera module is hidden inside the housing when the camera module is at the pop-down location.

In the electronic device provided by this application, the camera assembly in any embodiment of the first aspect is used as the camera assembly. In the camera assembly, two sides of the camera module each are slidably connected to the fastened holder by using a guide structure, and a plurality of push rods are symmetrically arranged with respect to a center line of the camera module. In this case, push/pull forces exerted on the camera module are symmetrical, and a probability that the camera module is stuck during movement is very small, to improve user experience.

In a possible implementation of the second aspect, the camera assembly is disposed at a location that is inside the housing and that is close to a top of the housing, and is close to a central region of the housing, and the avoidance hole is disposed at the top of the housing. In this case, when the camera module is at the pop-up location, a camera is aligned with a central region of the display.

In a possible implementation of the second aspect, when the camera module is at the pop-down location, a top surface of the camera module is flush with a top surface of the housing. In this case, appearance beauty of the electronic device can be improved.

In a possible implementation of the second aspect, a backplane is disposed inside the housing, the backplane has a first surface and a second surface that are opposite to each other, the display is disposed on the first surface, the camera assembly is disposed on the second surface, a power circuit board and a main board are further disposed on the second surface, the camera assembly is disposed in a region between the power circuit board and the main board, the power circuit board is electrically connected to the display, and the main board is electrically connected to the camera module. The camera assembly is disposed in the region between the power circuit board and the main board, to properly use a spatial location between the power circuit board and the main board.

REFERENCE NUMERALS

1: Camera assembly; 11: Fastened holder; 111: Frame body; 112: Front cover; 113: Back cover; 114: Sealing cover; 1141: Punch hole; 12: Camera module; 121: Pop-up/down housing; 1211: Light transmission hole; 1212: Concave region; 122: Camera component; 13: Driving source; 131: Push rod; 14: Guide shaft; 141: Clamping slot; 15: Sliding sleeve; 151: Insertion hole; 152: Connecting piece mounting hole; 16: Ear seat; 17: First limiting washer; 18: Second limiting washer; 19: Magnet; 2: Housing; 21: Avoidance hole; 3: Display; 4: Guide structure; 5: Backplane; 6: Power circuit board; 7: Main board; 8: Speaker; 9: Base mounting support; and 10: Base.

DESCRIPTION OF EMBODIMENTS

Embodiments of this application relate to a camera assembly and an electronic device. The following describes the camera assembly and the electronic device in detail with reference to the accompanying drawings.

An embodiment of this application provides an electronic device. Refer to FIG. 1a, FIG. 1b, FIG. 2a, and FIG. 2b. The electronic device includes a housing 2, a display 3, and a camera assembly 1 (including at least a camera component 122). The display 3 is disposed on the housing 2, and the camera assembly 1 is also disposed on the housing 2.

Figure 1A:
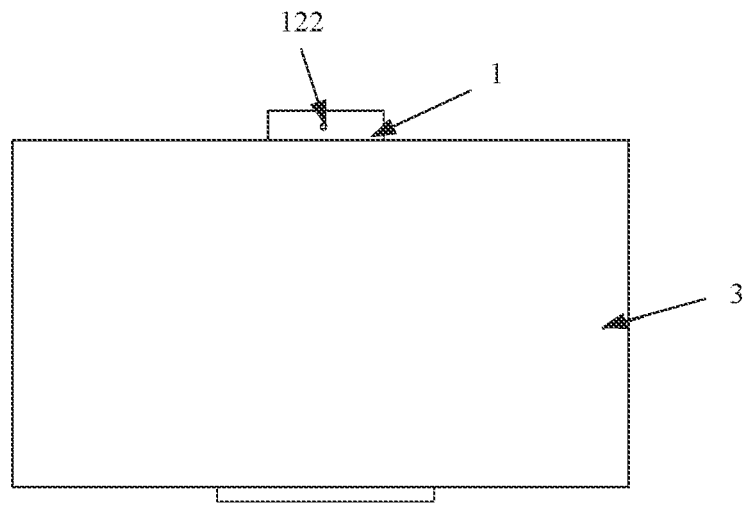
FIG. 1a is a schematic diagram of a structure in which a camera component of an electronic device is located outside a housing according to an embodiment of this application.
Figure 1B:
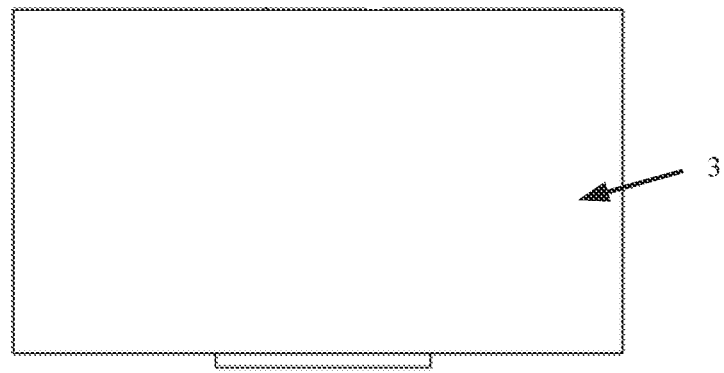
FIG. 1b is a schematic diagram of a structure in which a camera component of an electronic device is located inside a housing according to an embodiment of this application.

In order that the camera component 122 is exposed outside the housing 2 when the camera component is used (as shown in FIG. 1a), and the camera component 122 is hidden inside the housing 2 when the camera component is not used, a pop-up/down structure is used for the camera assembly. In other words, the camera assembly can move relative to the housing.

When the display is a large display (for example, more than 50 inches), a camera module 12 in the camera assembly 1 has both a large size and a heavy weight. It is critical that the camera module 12 can smoothly pop up/down without being stuck. Otherwise, user experience is greatly reduced. In some implementations, a size of the camera module 12 in a length direction is from 50 mm to 300 mm, and the length direction of the camera module 12 is a direction perpendicular to a first direction.

Figure 3A:
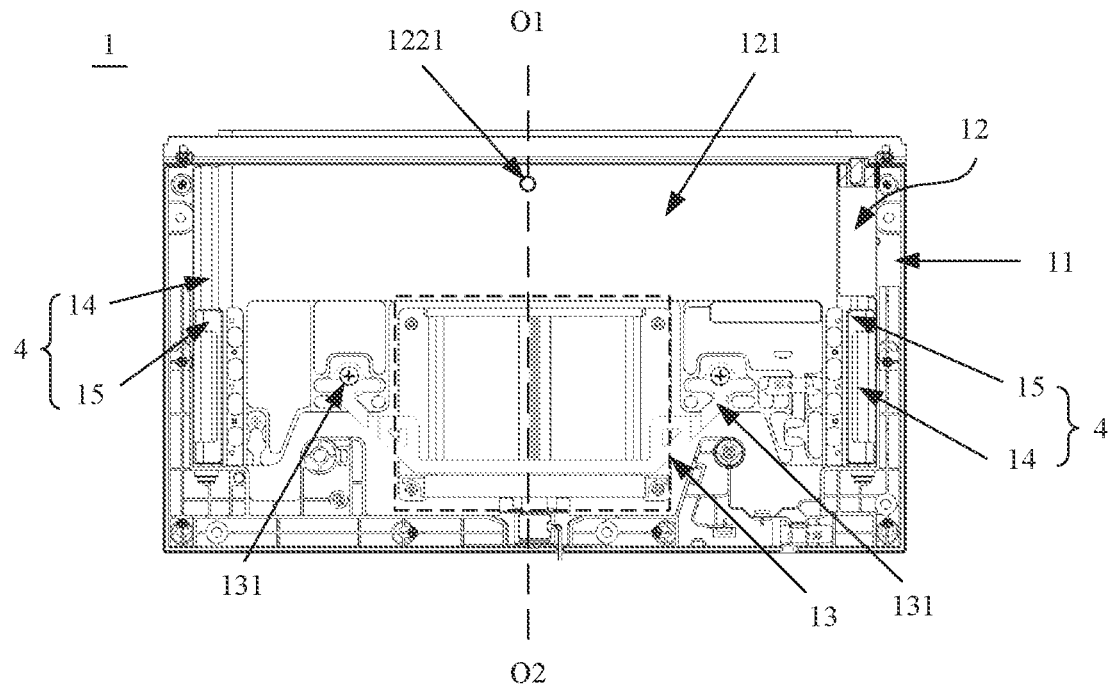
FIG. 3a is a schematic diagram of a structure existing before a camera module of a camera assembly moves according to an embodiment of this application.
Figure 3B:
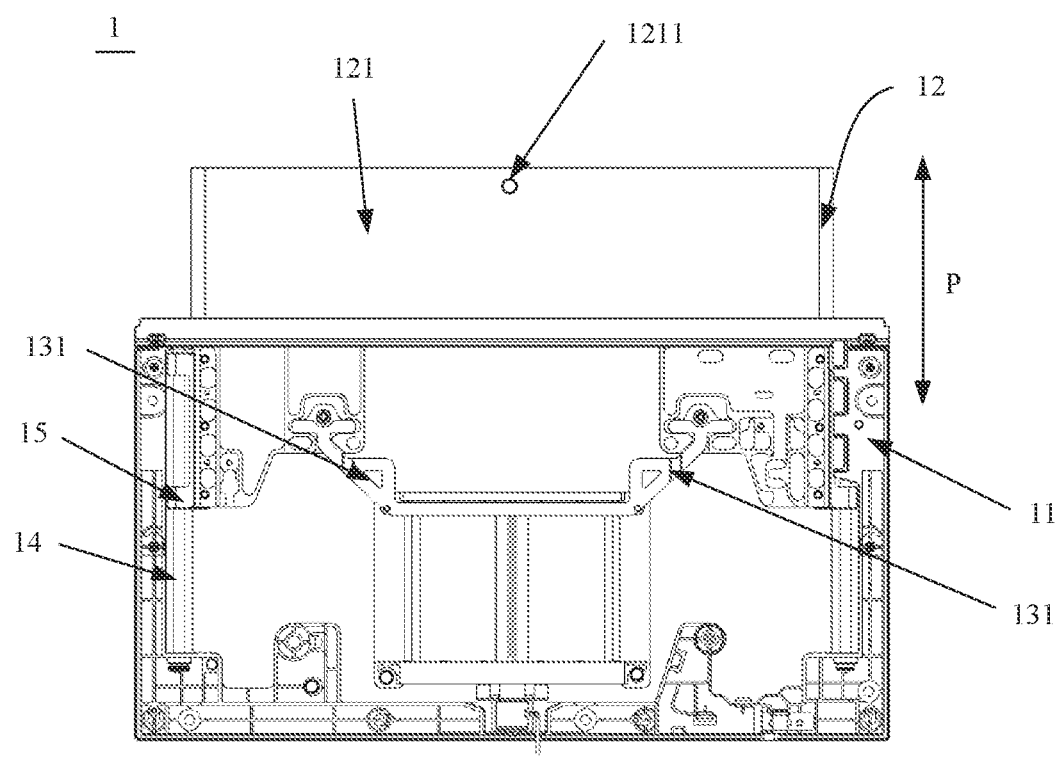
FIG. 3b is a schematic diagram of a structure existing after a camera module of a camera assembly moves according to an embodiment of this application.

In order that the camera module having a large size and a heavy weight moves stably without being stuck, this embodiment of this application provides the camera assembly 1. Refer to FIG. 3a and FIG. 3b. The camera assembly 1 includes a fastened holder 11, the camera module 12 (including at least the camera component 122), a driving source 13, a plurality of push rods 131, and a guide structure 4. Two opposite side faces of the camera module 12 each are connected to the fastened holder 11 by using the guide structure 4. The guide structure 4 is configured to guide the camera module 12 to slide in the first direction (a direction P shown in FIG. 3b) relative to the fastened holder 11. The plurality of push rods 131 and the camera module 12 are fastened relative to each other, the plurality of push rods 131 are symmetrically arranged relative to a center line (a line O1O2 in FIG. 3a) of the camera module 12, and the center line is parallel to the first direction. The driving source 13 and the fastened holder 11 are fastened relative to each other, the plurality of push rods 131 are connected to the driving source 13, the driving source 13 is configured to drive the plurality of push rods 131 to move synchronously, and a moving direction of the push rods 131 is parallel to the first direction.

A pop-up/down principle of the camera module 12 is as follows: The driving source 13 drives the plurality of push rods 131 to move synchronously in the first direction. Because the push rods 131 and the camera module 12 are fastened relative to each other, under an action of the push rods 131, the camera module 12 slides between a pop-up location and a pop-down location relative to the fastened holder 11 by using the guide structure 4. When sliding to the pop-up location, the camera module is located outside the housing of the electronic device, to perform photographing. When sliding to the pop-down location, the camera module is hidden inside the housing of the electronic device.

In this embodiment, two opposite sides of the camera module 12 each are slidably connected to the fastened holder 1 by using the guide structure 4, and the plurality of symmetrically arranged push rods 131 are used to exert push/pull forces on the camera module 12. In this case, the push/pull forces exerted on the camera module 12 are symmetrical, and a case in which a large pull force is exerted on one end of the camera module 12 and a small pull force is exerted on the other end does not occur. Therefore, the camera module 12 on which symmetrical forces are exerted slides smoothly along the oppositely arranged guide structures, and a probability that the camera module is stuck is very small even if the camera module has both a large size and a heavy weight.

It should be noted that, that the plurality of push rods are symmetrically arranged with respect to the center line of the camera module means that when a quantity of push rods is an even number, the push rods whose quantity is an even number are symmetrically arranged with respect to the center line of the camera module; or when a quantity of push rods is an odd number, one of the push rods is close to the center line of the camera module, and the other push rods are symmetrically arranged with respect to the center line of the camera module.

The electronic device may be a device such as an LCD television or a tablet computer.

There are a plurality of cases of a structure of the push rod. For example, refer to FIG. 3a and FIG. 3b. The push rod 131 is of an inverted T-shaped structure. Because the push rod of the inverted T-shaped structure and the camera module have a large contact area, when the push rod 131 is used to push/pull the camera module, the camera module has a large area of thrust surface, and moves more stably. Certainly, the push rod may alternatively be of another structure, and any other structure also falls within the protection scope of this application.

Figure 2A:
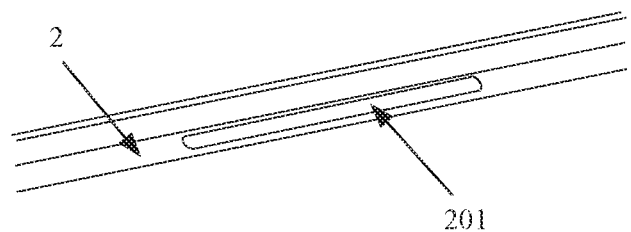
FIG. 2a is a schematic diagram of a partial structure in which a camera component of an electronic device is located inside a housing according to an embodiment of this application.
Figure 2B:
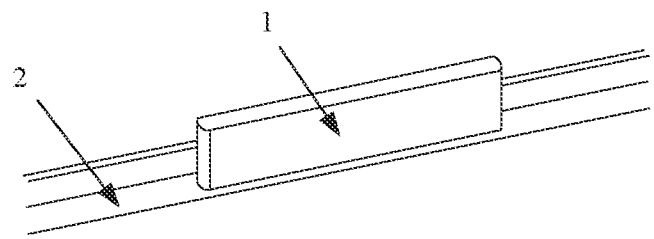
FIG. 2b is a schematic diagram of a partial structure in which a camera component of an electronic device is located outside a housing according to an embodiment of this application.

Refer to FIG. 3a and FIG. 3b. The camera module 12 includes a pop-up/down housing 121. The pop-up/down housing 121 is connected to the plurality of push rods 131, the pop-up/down housing 121 is provided with a light transmission hole 1211, a circuit board is disposed inside the pop-up/down housing 121, and a camera component is disposed at a location that is of the line board and that is opposite to the light transmission hole. The circuit board on which the camera component is mounted is disposed inside the pop-up/down housing, to protect an electronic component on the circuit board. A location at which the camera assembly 1 is disposed inside the housing 2 is as follows: Refer to FIG. 1a. The camera assembly 1 is disposed at a location that is inside the housing 2 and that is close to a top of the housing 1, and is close to a central region of the housing. Refer to FIG. 2a. An avoidance hole 201 is disposed at the top of the housing 1. In other words, when the camera component moves outside, a photographing effect produced when the camera component is at the top of the housing is better than a photographing effect produced when the camera component is disposed at another location.

In this embodiment of this application, there are a plurality of push rods, and the plurality of push rods are symmetrically arranged. Therefore, a light-emitting element, a microphone element, or another electronic element may be disposed on the circuit board, so that the light-emitting element and the microphone element are popped up/down.

To further improve appearance beauty of the electronic device, when the camera module is at the pop-down location, a top surface of the camera module is flush with a top surface of the housing.

Figure 4:
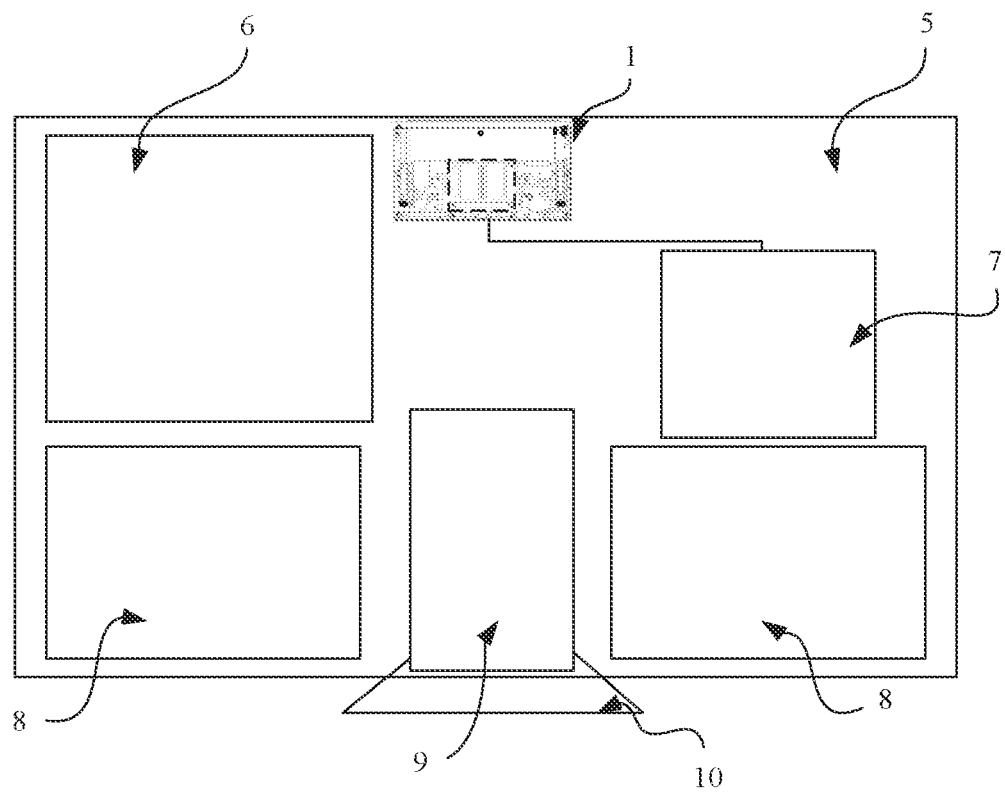
FIG. 4 is a diagram of a connection relationship between a camera assembly of an electronic device and another structure according to an embodiment of this application.

FIG. 4 shows a connection relationship and a location relationship between a camera assembly and another structure in an electronic device. A backplane 5 is disposed inside the housing, and the backplane 5 has a first surface and a second surface that are opposite to each other. The display is disposed on the first surface, and the camera assembly 1 is disposed on the second surface (for example, is detachably connected by using a connecting piece). A power circuit board 6 and a main board 7 are also disposed on the second surface. The camera assembly 1 is disposed in a region between the power circuit board 6 and the main board 7, the power circuit board 6 is electrically connected to the display, and the main board 7 is electrically connected to the camera module 1.

In addition, a speaker 8 is also disposed on the second surface of the backplane. A quantity of speakers 8 is not limited in this application. In addition, when the electronic device is an LCD television, the electronic device further includes a base mounting support 9. The base mounting support 9 is configured to support a base 10 of the LCD television.

There are a plurality of cases of implementable structures of the guide structure. The following provides explanations and descriptions by using two embodiments.

Embodiment 1

Figure 5:
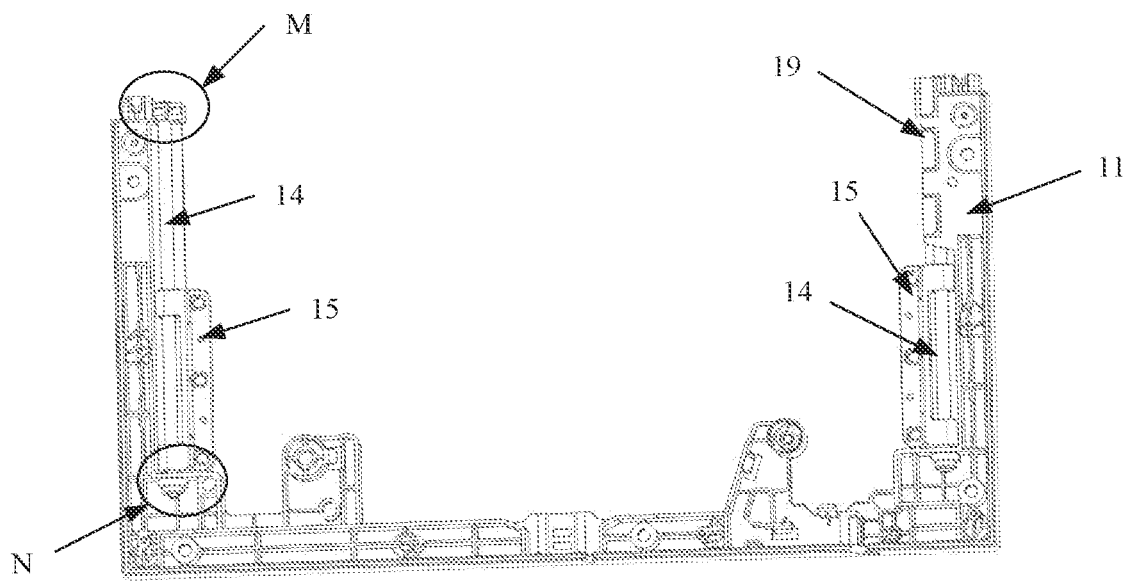
FIG. 5 is a schematic diagram of a connection relationship between a guide structure and a fastened holder according to an embodiment of this application.
Figure 6:
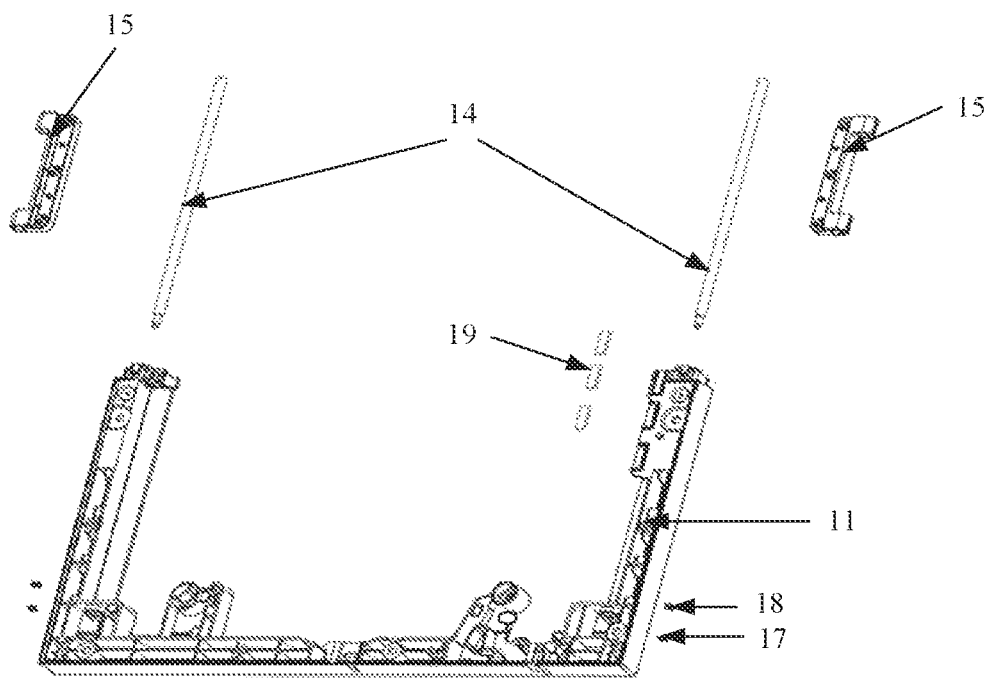
FIG. 6 is an exploded diagram of FIG. 5.
Figure 7:
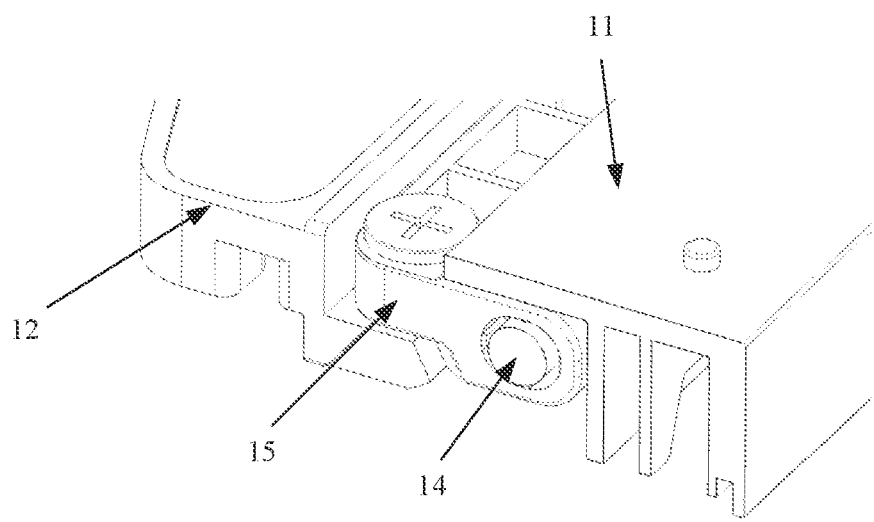
FIG. 7 is a partial schematic diagram of a connection relationship between a camera module, a sliding sleeve, a guide shaft, and a fastened holder according to an embodiment of this application.

Refer to FIG. 5, FIG. 6, and FIG. 7. A guide structure 4 includes a guide shaft 14 and a sliding sleeve 15. The guide shaft 14 and a fastened holder 11 are fastened relative to each other, and an extension direction of the guide shaft 14 is parallel to a first direction. The sliding sleeve 15 is sleeved outside the guide shaft 14, the sliding sleeve 15 can slide in the extension direction of the guide shaft 14, and a camera module 12 and the sliding sleeve 15 are fastened relative to each other.

When the camera module 12 moves relative to the fastened holder 11 under a driving force of a driving source, because the extension direction of the guide shaft 14 is parallel to the first direction, the sliding sleeve 15 connected to the camera module 12 slides in the extension direction of the guide shaft 14, to ensure that camera module 12 moves smoothly under the driving force of the driving source.

Embodiment 2

A guide structure includes a guide rail and a guide groove that matches each other, one of the guide rail and the guide groove is disposed on a fastened holder, and the other is disposed on a camera module.

Figure 8:
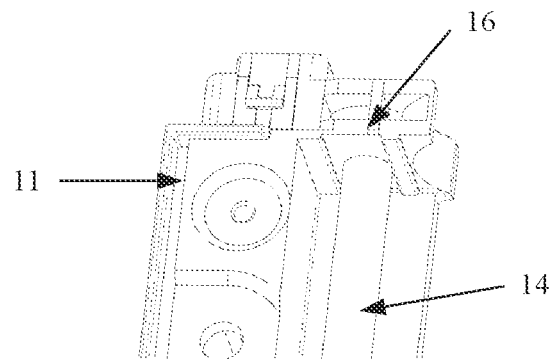
FIG. 8 is an enlarged diagram of a location M in FIG. 5.
Figure 9:
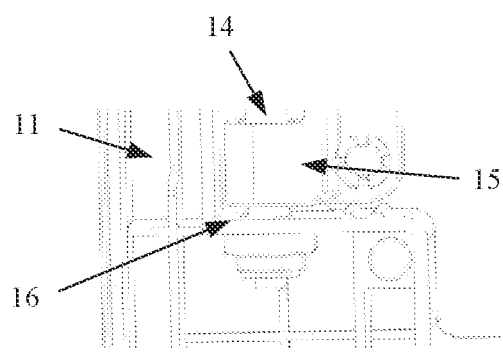
FIG. 9 is an enlarged diagram of a location N in FIG. 5.

In some implementations, refer to FIG. 8 and FIG. 9. Ear seats 16 are disposed at locations on a fastened holder 11 that are close to two end portions of a guide shaft 14, the ear seats 16 include insertion holes, the guide shaft 14 passes through the insertion holes and is fastened on the ear seats 16, and the sliding sleeve 15 is slidably disposed on a shaft section that is of the guide shaft 14 and that is between the two ear seats 16.

Such a fastening structure is used for the guide shaft and the sliding sleeve. The sliding sleeve 15 is slidably disposed on the shaft section of the guide shaft 14 between the two ear seats 16, and the two oppositely disposed ear seats further play a limiting role, to prevent the sliding sleeve 15 from sliding out from the end portion of the guide shaft 14. In other words, the ear seats 16 not only function as a mounting seat, but also function as a left part or a right part of a limiting structure. Compared with a case in which both the mounting seat and the limiting structure need to be disposed, in this structure, a structure of an entire camera assembly is simplified.

Figure 10:
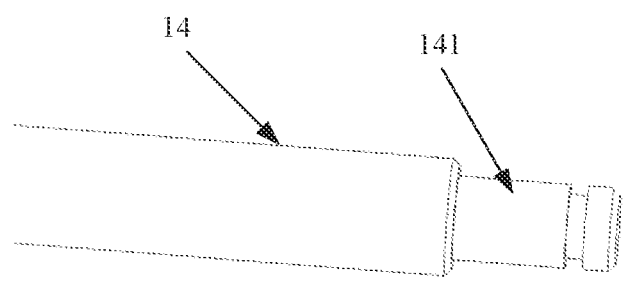
FIG. 10 is a schematic diagram of a partial structure of a guide shaft according to an embodiment of this application.
Figure 11:
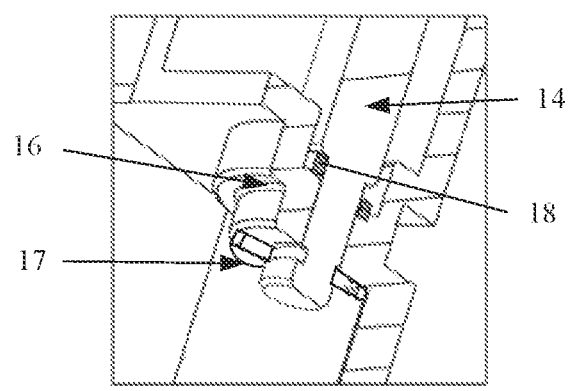
FIG. 11 is a schematic diagram of a connection relationship between a guide shaft and each of a first limiting washer and a second limiting washer according to an embodiment of this application.

There are a plurality of connection manners of the guide shaft 14 on the ear seat 16. For example, the guide shaft 14 is plug-connected to the ear seat 16 by using a plug. To be specific, the guide shaft 14 is provided with a plug hole. A depth direction of the plug hole is perpendicular to an axial direction of the guide shaft. A plug hole is also disposed at a location that is on the ear seat and that corresponds to the plug hole, and the plug is inserted into the two plug holes, to fixedly connect the guide shaft and the ear seat. For another example, refer to FIG. 10 and FIG. 11. One end of the guide shaft 14 is sleeved with a first limiting washer 17 and a second limiting washer 18, the first limiting washer 17 and the second limiting washer 18 are located in a clamping slot 141 at an end portion of the guide shaft 14, the first limiting washer 17 and the second limiting washer 18 are located on two opposite sides of the ear seat 16, and the guide shaft inserted into insertion boles of the two opposite ear seats is prevented from moving relative to the ear seat by using the first limiting washer and the second limiting washer, to connect that guide shaft and the ear seat. The first limiting washer and the second limiting washer may be a metal spring pad or a clamp spring, or may be of another structure.

Figure 12:
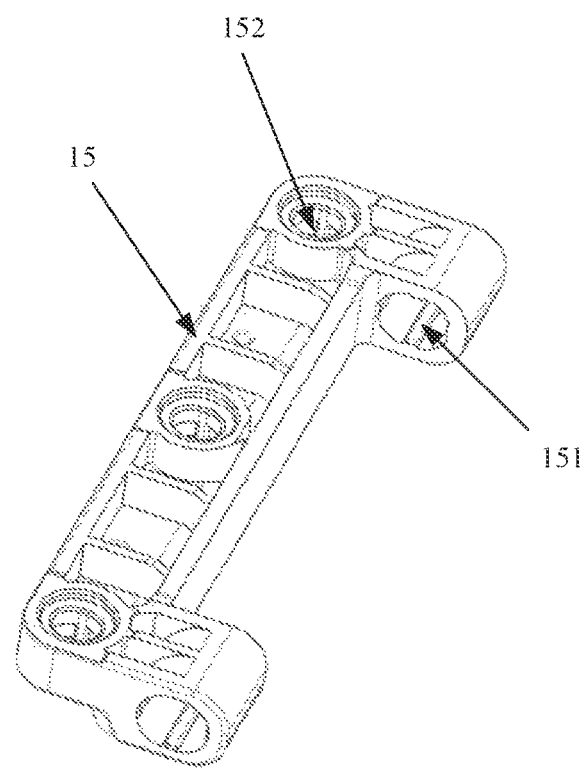
FIG. 12 is a schematic diagram of a structure of a sliding sleeve according to an embodiment of this application.

FIG. 12 is a schematic diagram of a structure of a sliding sleeve 15. The sliding sleeve 15 is provided with an insertion hole 151 through which the guide shaft passes, the insertion hole 151 and the guide shaft are in a clearance fit, the sliding sleeve 15 is further provided with a connecting piece mounting hole 152, and the sliding sleeve 15 is fixedly connected to the camera module by using a connecting piece disposed in the connecting piece mounting hole 152.

There are a plurality of embodiments of a driving source for driving a plurality of push rods. The following provides explanations and descriptions by using two embodiments.

Embodiment 1

A driving source includes a transmission mechanism and one drive motor. To be specific, a plurality of push rods are connected to one drive motor by using the transmission mechanism, an output shaft of the drive motor performs rotational motion, and the transmission mechanism is configured to convert the rotational motion of the output shaft of the drive motor into linear motion in which the push rod moves in a first direction.

Embodiment 2

A driving source includes a plurality of telescopic cylinders, a movement direction of a telescopic rod of the telescopic cylinder is parallel to a first direction, a telescopic rod of each telescopic cylinder is connected to one push rod, and a stretch and retraction of the telescopic rod are performed, to drive the push rod to move in the first direction, and further drive the camera module to move in the first direction relative to a fastened holder.

Compared with a case in which a plurality of telescopic rods are used to drive a plurality of push rods to move, in a case in which one drive motor is used to drive the plurality of push rods to move simultaneously, moving paces of the plurality of push rods are more consistent, so that push/pull forces are exerted by the push rods on the camera module are more even, and a probability that the camera module is stuck is smaller.

The transmission mechanism may be implemented in a plurality of manners. The following provides explanations and descriptions by using two embodiments.

Embodiment 1

A transmission mechanism includes a transmission screw rod, a traction member, and a leading structure. One end of the transmission screw rod is connected to an output shaft of a drive motor, the transmission screw rod is disposed in parallel to a first direction, the traction member threadedly matches the transmission screw rod, and the traction member is connected to a plurality of push rods, to drive the plurality of push rods to move synchronously. The leading structure is configured to guide the traction member to move along the transmission screw rod.

An operating principle of this embodiment is as follows: The output shaft of the drive motor rotates to drive the transmission screw rod to rotate. The traction member and the transmission screw rod perform spiral driving. Under an action of the leading structure, the traction member performs linear motion along the transmission screw rod, to drive the plurality of push rods to perform linear motion. Finally, the camera module is pushed to perform linear motion relative to the fastened holder.

In a specific implementation, a guide block may be disposed on a side of the transmission screw rod, a guide groove is disposed on the guide block, an extension direction of the guide groove is consistent with an extension direction of the transmission screw rod, and a part of the traction member passes through the guide groove, so that when the transmission screw rod rotates, the traction member performs linear motion along the transmission screw rod under an action of the guide groove.

Embodiment 2

A transmission mechanism includes a drive wheel and a moving rod. The drive wheel is mounted on an output shaft of a drive motor, the moving rod includes meshing teeth arranged in a first direction, the meshing teeth on the moving rod mesh with the drive wheel, a plurality of push rods are connected by using a connecting rod, and the connecting rod is connected to the moving rod.

An operating principle of this embodiment is as follows: The output shaft of the drive motor rotates to drive the drive wheel to rotate. The drive wheel performs transmission through meshing, to drive the moving rod to perform linear motion in the first direction, and further drive, by using the connecting rod, the plurality of push rods to move synchronously in the first direction, so as to finally push a camera module to perform linear motion relative to a fastened holder.

This application lists two embodiments of the transmission mechanism, and an embodiment of another structure also falls within the protection scope of this application.

To detect a moving distance of a camera module, a camera assembly further includes a location detection structure. The location detection structure includes a magnetic induction sensor and a magnet. The magnetic induction sensor is disposed on a circuit board, and a magnet 19 is fastened on a fastened holder 11 (as shown in FIG. 5 and FIG. 6). In a moving process of the camera module, the magnetic induction sensor can sense a change in a magnetic field of the magnet and output a changed electrical signal. In a specific implementation, when the electrical signal output by the magnetic induction sensor reaches a preset electrical signal value, the camera module reaches a location that may be preset.

Figure 13:
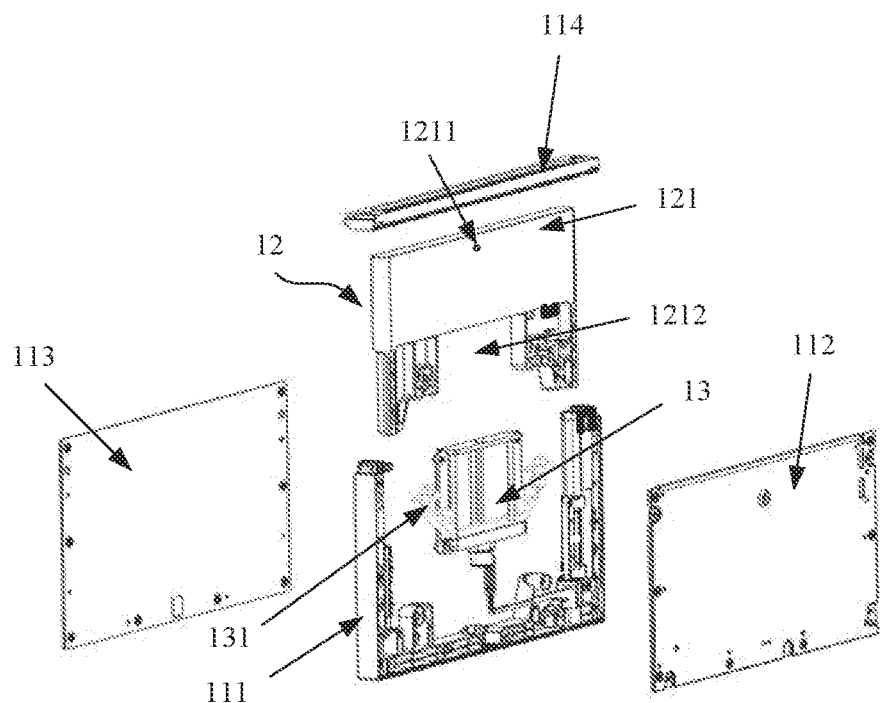
FIG. 13 is an exploded diagram of a camera assembly according to an embodiment of this application.

Refer to FIG. 13. A driving source 13 is disposed close to a middle location at a bottom of the fastened holder 11, a concave region 1212 is formed at a location that is on a pop-up/down housing 121 and that is close to the driving source 13, the driving source 13 drives the camera module 12 to move between a pop-up location and a pop-down location, the driving source 13 is located in the concave region 1262 when the camera module 12 is at the pop-down location, and the driving source 13 is separated from the concave region 1261 when the camera module 12 is at the pop-up location, so that the camera assembly is of a compact structure and occupies small space.

In other words, the concave region 1212 for placing the driving source 13 is formed on the pop-up/down housing 121, to reduce a size of the entire camera assembly, and correspondingly, reduce occupied space inside a housing of an electronic device.

In a structure shown in FIG. 13, two push rods may be disposed, and one push rod is disposed on each side of the driving source. The camera module is pushed/pulled by using the two push rods, and push/pull forces exerted on the camera module are also even, so that the camera module can move smoothly.

In some implementations, a cavity is formed in the fastened holder, the driving source, the camera module, and the push rod are all disposed in the cavity, the fastened holder further has a punch bole communicating with the cavity, and the camera module can extend to an outside of the cavity through the punch bole when moving relative to the fastened holder. The driving source, the camera module, and the push rod are disposed in the cavity, to protect an electronic component. In addition, when the camera module is at the pop-down location, the camera module is located in the cavity, to not only protect the camera module, but also realize compactness of the entire structure. The fastened holder is provided with the punch hole, so that the camera module moves between the pop-up location and the pop-down location.

When the fastened holder is fastened inside a housing of an electronic device having a large-size display, because there are a large quantity of other components inside the housing and the structure is compact, other structures are easily in contact with the fastened holder, and even the fastened holder is squeezed. Further, the fastened holder may tilt toward the camera module, and consequently, interfere with the camera module, and affect movement of the camera module. To avoid this phenomenon, a side surface that is of the fastened holder and that faces the camera module is made of a rigid material. In other words, the rigid material is used to prevent the fastened holder from tilting toward the camera module to prevent the camera module from moving.

There are a plurality of cases of a structure of the fastened holder. For example, refer to FIG. 14. The fastened holder 11 includes a frame body 111 (including a bottom plate and two opposite side plates), a front cover 112, a back cover 113, and a sealing cover 114. The bottom plate and the two opposite side plates may be integrally formed into the frame body 111, or may be assembled by using a connecting piece. The front cover 112 and the back cover 113 are oppositely disposed on two sides of the frame body, and are detachably connected to the bottom plate and the side plates of the frame body by using a connecting piece. The sealing cover 114 is disposed on a top of the frame body 111, and is detachably connected to two side plates of the frame body. The bottom plate, the two side plates, the front cover, the back cover, and the sealing cover enclose a cavity. In a specific implementation, after a drive structure and the camera module are mounted on the frame body 111, the front cover 112, the back cover 113, and the sealing cover 114 are mounted, to facilitate a check and repair during maintenance. The sealing cover 114 is provided with a punch hole 1141, so that the camera module moves to an outside of the cavity through the punch hole during movement.

Figure 14:
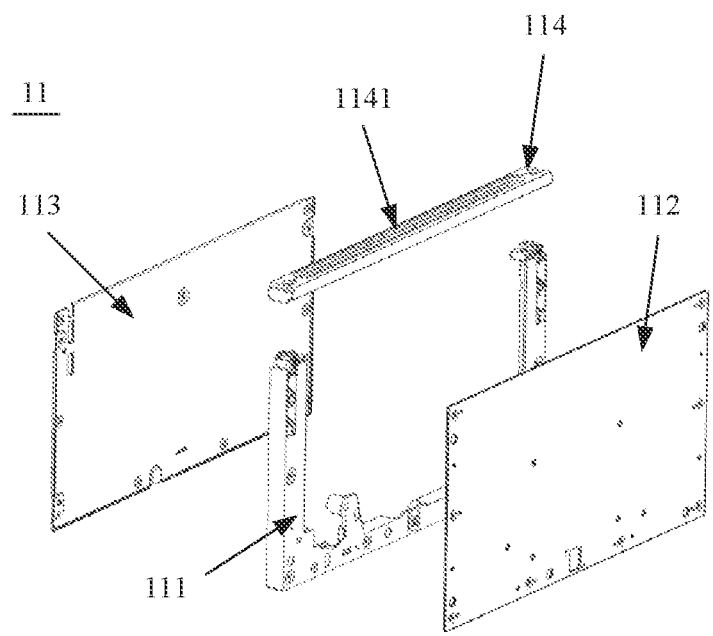
FIG. 14 is an exploded diagram of a fastened holder according to an embodiment of this application.

In the fastened holder shown in FIG. 14, a steel plate with high mechanical strength is selected for the front cover and the back cover, and the steel plate with high mechanical strength is used to increase strength of the front cover and the back cover, to avoid interfering with the camera module by the front cover and the back cover when the front cover and the back cover are squeezed by another structure.

In the descriptions of this specification, the specific features, structures, materials, or characteristics may be combined in a proper manner in any one or more of embodiments or examples.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A camera assembly, disposed on an electronic device, and comprising:
    a fastened holder;
    a camera module comprising:
        two opposite side faces, wherein each of the two opposite side faces are coupled to the fastened holder using a guide structure, and wherein the guide structure is configured to guide the camera module to slide in a first direction relative to the fastened holder;
        a pop-up/down housing provided with a light transmission hole;
        a circuit board disposed inside the pop-up/down housing; and
        a camera component disposed at a location on the circuit board and opposite to the light transmission hole;
    a plurality of push rods coupled to the pop-up/down housing, and wherein the plurality of push rods and the camera module are fastened relative to each other; and
    a driving source configured to drive the plurality of push rods to move synchronously in a direction parallel to the first direction, wherein the driving source and the fastened holder are fastened relative to each other, and wherein the plurality of push rods is coupled to the driving source and is arranged on both sides of the driving source.

2. The camera assembly according to claim 1, wherein the guide structure comprises:
    a guide shaft having an extension direction parallel to the first direction, wherein the guide shaft and the fastened holder are fastened relative to each other; and
    a sliding sleeve configured to slide in the extension direction of the guide shaft, wherein the sliding sleeve is sleeved outside the guide shaft, and wherein the camera module and the sliding sleeve are fastened relative to each other.

3. The camera assembly according to claim 2, further comprising ear seats disposed at locations on the fastened holder that are close to two end portions of the guide shaft, wherein the ear seats comprise insertion holes, wherein the guide shaft passes through the insertion holes and is fastened on the ear seats, and wherein the sliding sleeve is slidably disposed on a shaft section of the guide shaft and between the ear seats.

4. The camera assembly according to claim 1, wherein the driving source comprises:
    a drive motor;
    a transmission screw rod comprising one end coupled to an output shaft of the drive motor, wherein an extension direction of the transmission screw rod is parallel to the first direction;
    a traction member coupled to the plurality of push rods and configured to drive the plurality of push rods to move synchronously, wherein the traction member threadedly matches the transmission screw rod; and
    a leading structure configured to guide the traction member to move along the transmission screw rod.

5. The camera assembly according to claim 1, wherein the driving source is disposed close to a middle location at a bottom of the fastened holder, wherein one push rod of the plurality of push rods is disposed at each of two sides of the driving source, wherein a concave region is formed at a location on the pop-up/down housing and close to the driving source, wherein the driving source is configured to drive, using the plurality of push rods, the camera module to move between a pop-up location and a pop-down location, wherein the driving source is located in the concave region when the camera module is at the pop-down location, and wherein the driving source is separated from the concave region when the camera module is at the pop-up location.

6. The camera assembly according to claim 1, wherein a cavity is formed in the fastened holder, wherein the driving source, the camera module, and the plurality of push rods are all disposed in the cavity, wherein the fastened holder further has a punch hole communicating with the cavity, and wherein the camera module is configured to extend to an outside of the cavity through the punch hole when moving relative to the fastened holder.

7. The camera assembly according to claim 1, wherein each of the plurality of push rods is of an inverted T-shaped structure.

8. The camera assembly according to claim 1, wherein a size of the camera module in a length direction is from 50 millimeter (mm) to 300 mm, and wherein the length direction of the camera module is a direction perpendicular to the first direction.

9. An electronic device, comprising:
a housing comprising an avoidance hole through which a camera module passes;
a display disposed on the housing; and
a camera assembly disposed on the electronic device, comprising:
a fastened holder,
wherein the camera module comprises:
two opposite side faces, wherein each of the two opposite sides faces are coupled to the fastened holder using a guide structure, and wherein the guide structure is configured to guide the camera module to slide in a first direction relative to the fastened holder;
a pop-up/down housing provided with a light transmission hole;
a circuit board disposed inside the pop-up/down housing; and
a camera component disposed at a location on the circuit board and opposite to the light transmission hole;
a plurality of push rods coupled to the pop-up/down housing, and wherein the plurality of push rods and the camera module are fastened relative to each other; and
a driving source configured to drive the plurality of push rods to move synchronously in a direction parallel to the first direction, wherein the driving source and the fastened holder are fastened relative to each other, and wherein the plurality of push rods is coupled to the driving source and is arranged on both sides of the driving source,
wherein the fastened holder, the driving source, and the push rod are all disposed inside the housing, wherein the driving source is configured to drive the push rod to move, so that the camera module moves between a pop-up location and a pop-down location relative to the fastened holder, wherein the camera module is located outside the housing when the camera module is at the pop-up location, and wherein the camera module is hidden inside the housing when the camera module is at the pop-down location.

10. The electronic device according to claim 9, wherein the guide structure comprises:
a guide shaft configured to have an extension direction parallel to the first direction, wherein the guide shaft and the fastened holder are fastened relative to each other; and
a sliding sleeve configured to slide in the extension direction of the guide shaft, wherein the sliding sleeve is sleeved outside the guide shaft, and wherein the camera module and the sliding sleeve are fastened relative to each other.

11. The electronic device according to claim 10, further comprising ear seats disposed at locations on the fastened holder that are close to two end portions of the guide shaft, wherein the ear seats comprise insertion holes, wherein the guide shaft passes through the insertion holes and is fastened on the ear seats, and wherein the sliding sleeve is slidably disposed on a shaft section of the guide shaft and between the ear seats.

12. The electronic device according to claim 9, wherein the driving source comprises:
a drive motor;
a transmission screw rod comprising one end coupled to an output shaft of the drive motor, wherein an extension direction of the transmission screw rod is parallel to the first direction;
a traction member coupled to the plurality of push rods and configured to drive the plurality of push rods to move synchronously, wherein the traction member threadedly matches the transmission screw rod; and
a leading structure configured to guide the traction member to move along the transmission screw rod.

13. The electronic device according to claim 9, wherein the driving source is disposed close to a middle location at a bottom of the fastened holder, wherein one push rod of the plurality of push rods is disposed at each of two sides of the driving source, wherein a concave region is formed at a location on the pop-up/down housing and close to the driving source, wherein the driving source is configured to drive, by using the plurality of push rods, the camera module to move between the pop-up location and the pop-down location, wherein the driving source is located in the concave region when the camera module is at the pop-down location, and wherein the driving source is separated from the concave region when the camera module is at the pop-up location.

14. The electronic device according to claim 9, wherein a cavity is formed in the fastened holder, wherein the driving source, the camera module, and the plurality of push rods are all disposed in the cavity, wherein the fastened holder further has a punch hole communicating with the cavity, and wherein the camera module is configured to extend to an outside of the cavity through the punch hole when moving relative to the fastened holder.

15. The electronic device according to claim 9, wherein each of the plurality of push rods is of an inverted T-shaped structure.

16. The electronic device according to claim 9, wherein the camera assembly is disposed at a location inside the housing, close to a top of the housing, and close to a central region of the housing, and wherein the avoidance hole is disposed at the top of the housing.

17. The electronic device according to claim 9, wherein when the camera module is at the pop-down location, a top surface of the camera module is flush with a top surface of the housing.

18. The electronic device according to claim 9, wherein a backplane is disposed inside the housing, wherein the backplane has a first surface and a second surface that are opposite to each other, wherein the display is disposed on the first surface, wherein the camera assembly is disposed on the second surface, wherein a power circuit board and a main board are further disposed on the second surface, wherein the camera assembly is disposed in a region between the power circuit board and the main board, wherein the power circuit board is electrically connected to the display, and wherein the main board is electrically connected to the camera module.

19. The electronic device according to claim 9, wherein a size of the camera module in a length direction is from 50 millimeter (mm) to 300 mm, and wherein the length direction of the camera module is a direction perpendicular to the first direction.

20. An electronic device, and comprising:
a housing comprising an avoidance hole through which a camera module passes;
a display disposed on the housing; and
a camera assembly comprising:
a fastened holder,
wherein the camera module comprises:
two opposite side faces, wherein each of the two opposite side faces are coupled to the fastened holder using a guide structure, and wherein the guide structure is configured to guide the camera module to slide in a first direction relative to the fastened holder; and
a pop-up/down housing;
a plurality of push rods coupled to the pop-up/down housing, wherein the plurality of push rods and the camera module are fastened relative to each other; and
a driving source configured to drive the plurality of push rods to move synchronously in a direction parallel to the first direction, wherein the driving source and the fastened holder are fastened relative to each other, and wherein the plurality of push rods is coupled to the driving source and is arranged on both sides of the driving source,
wherein the fastened holder, the driving source, and the push rod are all disposed inside the housing, wherein the driving source is configured to drive the push rod to move, so that the camera module moves between a pop-up location and a pop-down location relative to the fastened holder, wherein the camera module is located outside the housing when the camera module is at the pop-up location, wherein the camera module is hidden inside the housing when the camera module is at the pop-down location,
wherein the driving source is disposed close to a middle location at a bottom of the fastened holder, wherein one push rod of the plurality of push rods is disposed at each of two sides of the driving source, wherein a concave region is formed at a location on the pop-up/down housing and close to the driving source, wherein the driving source is located in the concave region when the camera module is at the pop-down location, and wherein the driving source is separated from the concave region when the camera module is at the pop-up location.

21. A camera assembly, disposed on an electronic device, and comprising:
a fastened holder;
a camera module comprising:
two opposite side faces, wherein each of the two opposite side faces are coupled to the fastened holder using a guide structure, and wherein the guide structure is configured to guide the camera module to slide in a first direction relative to the fastened holder;
a plurality of push rods coupled to a pop-up/down housing, and wherein the plurality of push rods and the camera module are fastened relative to each other; and
a driving source configured to drive the plurality of push rods to move synchronously in a direction parallel to the first direction, wherein the driving source and the fastened holder are fastened relative to each other, and wherein the plurality of push rods is coupled to the driving source is arranged on both sides of the driving source;
wherein the driving source is disposed close to a middle location at a bottom of the fastened holder, wherein one push rod of the plurality of push rods is disposed at each of two sides of the driving source, wherein a concave region is formed at a location on the pop-up/down housing and close to the driving source, wherein the driving source is configured to drive, using the plurality of push rods, the camera module to move between a pop-up location and a pop-down location, wherein the driving source is located in the concave region when the camera module is at the pop-down location, and wherein the driving source is separated from the concave region when the camera module is at the pop-up location.

\* \* \* \* \*